(12) United States Patent
Gnutzmann

(10) Patent No.: US 6,512,847 B1
(45) Date of Patent: Jan. 28, 2003

(54) METHOD FOR GENERATING A FRAME FOR GRAPHIC OBJECTS THAT ARE DESCRIBED BY BEZIER CURVES

(75) Inventor: Frank Gnutzmann, Gettorf (DE)

(73) Assignee: Heidelberger Druckmaschinen Aktiengesellschaft, Heidelberg (DE)

( * ) Notice: Subject to any disclaimer, the term of this patent is extended or adjusted under 35 U.S.C. 154(b) by 0 days.

(21) Appl. No.: 09/482,915

(22) Filed: Jan. 14, 2000

(30) Foreign Application Priority Data

Jan. 19, 1999 (DE) .......................... 199 01 934

(51) Int. Cl.[7] .................................................. G06K 9/34
(52) U.S. Cl. ...................................................... 382/173
(58) Field of Search ................................. 382/173, 199, 382/201, 203, 276; 345/440, 441, 442, 443, 469, 469.1

(56) References Cited

U.S. PATENT DOCUMENTS

| 5,214,754 A | | 5/1993 | Okamoto et al. | |
| 5,255,198 A | | 10/1993 | Yoko et al. | |
| 5,280,576 A | | 1/1994 | Cao | |
| 5,301,267 A | | 4/1994 | Hassett et al. | |
| 5,717,847 A | * | 2/1998 | Schulmeiss | 345/442 |
| 5,920,324 A | * | 7/1999 | Hasegawa et al. | 345/467 |
| 6,157,750 A | * | 12/2000 | Choi et al. | 382/203 |
| 6,295,072 B1 | * | 9/2001 | Pon et al. | 345/442 |
| 6,404,434 B1 | * | 6/2002 | Shimada et al. | 345/442 |

* cited by examiner

*Primary Examiner*—Phuoc Tran
(74) *Attorney, Agent, or Firm*—Schiff Hardin & Waite

(57) ABSTRACT

A method for producing a frame for a graphic object whose contour is defined by a sequence of Bezier curves is disclosed. To that end, a frame curve that is likewise a Bezier curve and that proceeds approximately parallel to the given Bezier curve is likewise produced for each Bezier curve of the contour. A mid-point PM is formed on the given Bezier curve. Proceeding therefrom at the spacing of the frame width, a mid-point QM for the frame curve to be produced is defined. The checkpoints of the frame curve are defined such that they proceed through the point QM.

7 Claims, 6 Drawing Sheets

METHOD FOR GENERATING A FRAME FOR GRAPHIC OBJECTS THAT ARE DESCRIBED BY BEZIER CURVES

BACKGROUND OF THE INVENTION

The invention is in the field of digital image processing and is directed to a method for generating a frame for a graphic object whose contour is described by a sequence of Bezier curves. The generation of a frame for graphic objects is a job that occurs in many fields of application of digital image processing.

An important field of application is electronic reproduction technology wherein print masters for printed pages are produced, these containing all elements to be printed such as texts, graphic objects and images. In the case of electronic production of the print masters, these elements are present in the form of digital data. The data are generated for an image, for example, in that the image is scanned point-by-point and line-by-line in a scanner, each element is resolved into color components, and the color values of these components are digitalized. The data for texts and graphic objects are generally generated directly in a computer by text processing and drawing for drafting programs. Dependent on the output process employed later, for example, output on a color printer or printing in a conventional printing machine, the data for the page elements are generated and stored in the color components red, green and blue (RGB) or in the inks of 4-color printing of cyan, magenta, yellow and black (CMYK).

During the further work sequence, the digitalized texts, graphic objects and images are assembled to form a printed page in a processing station either under visual control on a color monitor or automatically according to stored layout rules. The printed page data are then converted into a data format suitable for the output, for example, into the page description language PostScript and are stored. Separate printed page data, which are referred to as color separation data, are thereby produced for each of the inks in CMYK. The color separation data are output with a film or plate recorder in high resolution on film material or directly on printing plates. There are also digital printing machines that work without printing plates. In this case, the color separation data are directly transferred to the digital printing machine and are printed thereat on the printing material.

SUMMARY OF THE INVENTION

Before the recording, the printed page data are checked at a processing station, and are modified in many ways according to the rules of a layout, and are processed according to the manuscript, for example, corrected in color, are positioned on the printed page, etc. A frequent modification is thereby the production of a frame for a graphic object. What is hereby understood by a graphic object is an area having an arbitrary shape whose contour is described in terms of data by a sequence of curves and straight sections, and that is filled with color values in an arbitrary way. In the simplest case, the area is filled with a constant color. However, it can also contain a color progression, i.e., a continuous variation of the colors in a specific chromatic range. A graphic object can also contain scanned image data or a pattern of different color values. It is of no significance in conjunction with the present invention as to what colors are contained in the area of the graphic object and how they are distributed. The only thing of significance is that the contour of the graphic object is described by a sequence of curved and straight sections and is to be framed.

What is achieved by the framing of a graphic object and the coloration of the frame with a contrasting color is, for example, that it is more clearly contrasted compared to neighboring, graphic objects or compared to the background. Another important application for the production of a frame around a graphic object in the area of reproduction and printing technology is what is referred to as trapping. A frame is thereby produced in only some color separations of the graphic object but not in other color separations. What is thus achieved is that, given shifts of the color separations relative to one another in the printing machine (registration errors), no disturbing white edge of unprinted paper can be seen at a part of the contour of the graphic object on the finished printed page. What is assured by the trapping of the correct color separations is that an adequate great overlap of the graphic object with its environment is still present given such shifts, so that all locations of the printed page are printed. Those color separations for which a frame is generated and those for which a frame need not be generated are dependent upon the colors within the graphic object in relationship to the colors in its immediate environment.

According to the method of the present invention for framing a graphic object whose contour is described by cubic Bezier curves by producing an approximately parallel, cubic Bezier frame curve having checkpoints Q0, Q1, Q2, Q3 for each given cubic Bezier curve of the contour having checkpoints P0, P1, P2, P3, the checkpoint Q0 is defined proceeding from the checkpoint P0 perpendicular to a line P0-P1 at a spacing of a frame width. The checkpoint Q3 is defined proceeding from the checkpoint P3 perpendicular to a line P2-P3 at the spacing of the frame width. The checkpoint Q1 is placed onto a first parallel that proceeds through the checkpoint Q0 parallel to the line P0-P1. The checkpoint Q2 is placed onto a second parallel that proceeds through the checkpoint Q3 parallel to the line P2-P3. A midpoint PM for the given Bezier curve is constructed from the checkpoints P0, P1, P2, P3. A midpoint QM for the Bezier frame curve to be produced is determined proceeding from the mid-point PM perpendicular to the given Bezier curve at the spacing of the frame width. A position of the checkpoint Q1 on the first parallel and the checkpoint Q2 on the second parallel is calculated from a condition that the mid-point QM can be constructed in the same way from the checkpoints Q0, Q1, Q2, Q3 as the mid-point PM is constructed from the checkpoints P0, P1, P2, P3.

DESCRIPTION OF THE PREFERRED EMBODIMENTS

Figure 1:
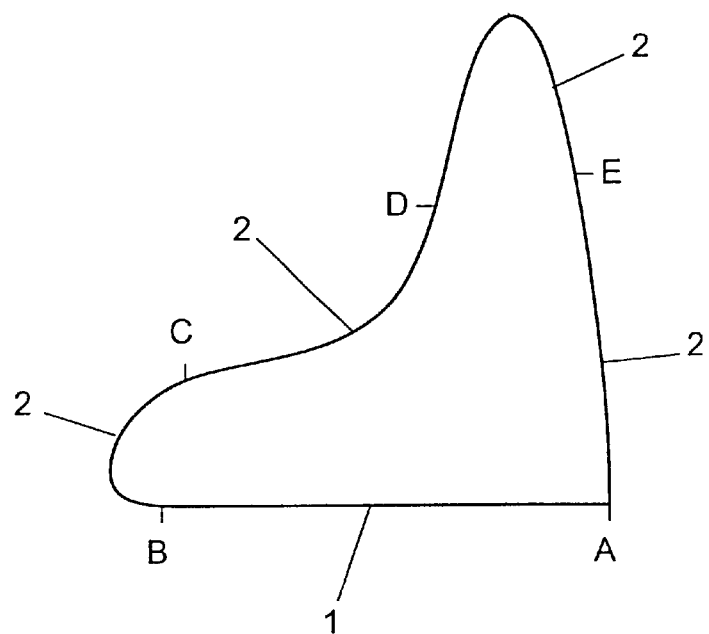
FIG. 1 is an example of a graphic object whose contour is composed of a sequence of curved and straight sections.

The contour of a graphic object is generally produced as a sequence of curved and straight sections with a drafting program. FIG. 1 shows an example of such a graphic object whose contour is composed of a straight section 1 and four curved sections 2. The letters A . . . E identify the locations on the contour at which a curved or, respectively, straight section ends and the following one begins.

Figure 2:
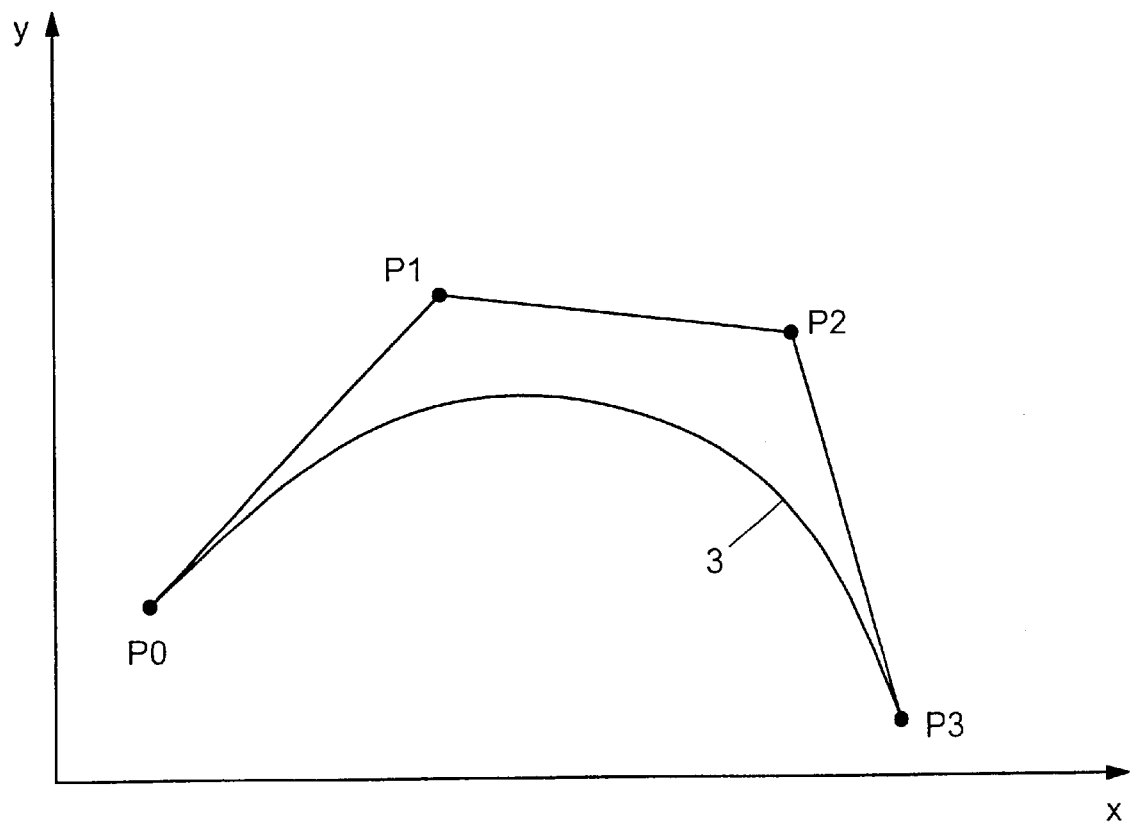
FIG. 2 shows a cubic Bezier curve.

In many drafting programs and in the page description language PostScript as well, the curved sections are described as cubic Bezier curves. FIG. 2 shows a cubic Bezier curve 3 in a x,y-coordinate system. The Bezier curve 3 is defined by the four checkpoints P0, P1, P2, P3. The checkpoints P0 and P3 define the starting point and the end point of the curve. The straight line P0-P1 is the tangent of the curve at the start point P0, i.e. it defines the slope of the curve in the start point P0. Likewise, the straight line P2-P3 is the tangent of the curve in the end point P3. The x and y coordinates of points in the Bezier curve are defined by the following, parametric equations:

$$x(t) = xP0 \cdot (1-t)^3 + 3 \cdot xP1 \cdot (1-t)^2 \cdot t + 3 \cdot xP2 \cdot (1-t) \cdot t^2 + xP3 \cdot t^3$$

$$y(t) = yP0 \cdot (1-t)^3 + 3 \cdot yP1 \cdot (1-t)^2 \cdot t + 3 \cdot yP2 \cdot (1-t) \cdot t^2 + yP3 \cdot t^3 \quad (1)$$

(xPi, yPi) are thereby the coordinates of the check points P0 . . . P3, and the parameter t assumes values between 0 and 1.

Figure 3:
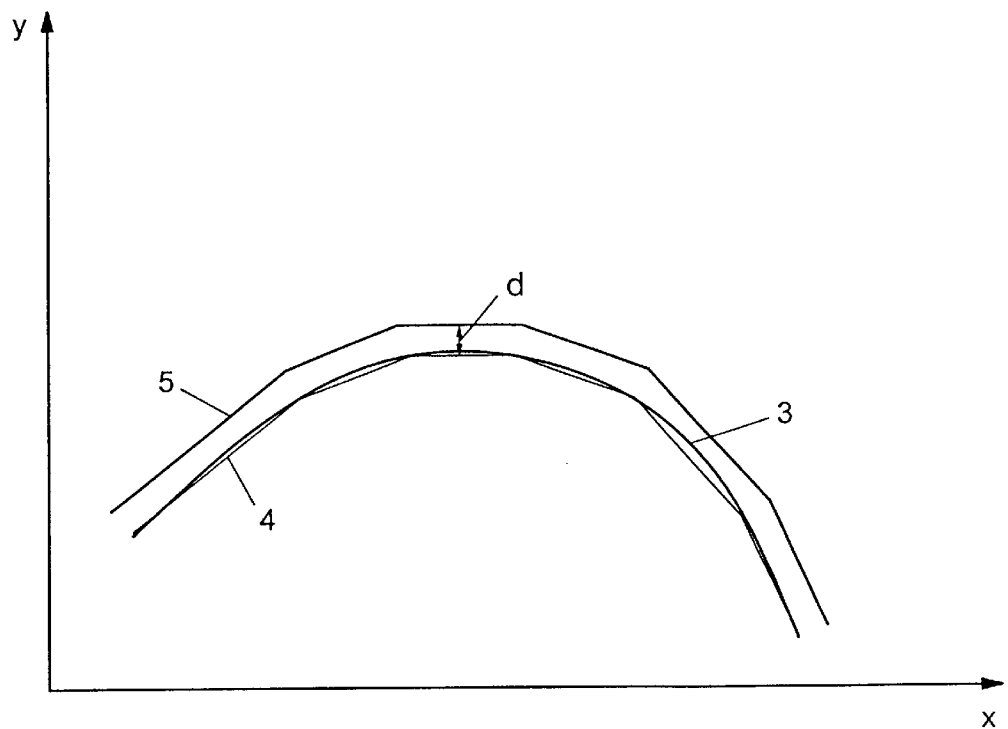
FIG. 3 shows a method for generating a frame according to the prior art.

Various methods for generating a frame for a Bezier curve are known from the prior art. FIG. 3 shows a simple method, whereby the Bezier curve 3 is first approximated by straight sections 4 and a parallel straight section 5 is then constructed for each straight section 4 at the spacing of the frame width d. For illustrating the benefit, FIG. 3 shows a relatively rough approximation of the Bezier curve 3. In practice, significantly more, shorter straight sections 4 are employed for the approximation. Instead of the straight sections 4 or 5, one can also employ simple curves, for example parable sections. This method is very computational-intensive, particularly when a great number of short straight sections 4 or 5 must be calculated for an exact approximation. Moreover, the method has the disadvantage that the frame curve is no longer described as a Bezier curve, which makes further processing of the graphic objects more complicated.

In a further method of the prior art, the graphic object is first converted into a matrix of picture elements having a desired resolution, preferably in the resolution of the later recording. An imaginary circle having the diameter of the desired frame width is then unrolled on the contour of the graphic object according to an algorithm, and all picture elements contacted by the circle form the frame. This method is also very calculation-intensive, particularly for a high recording resolution. Moreover, the frame here is no longer described at all by limiting curved or, respectively, straight sections, this being disadvantageous for further processing, for example, for a subsequent conversion into a different resolution.

Figure 4:
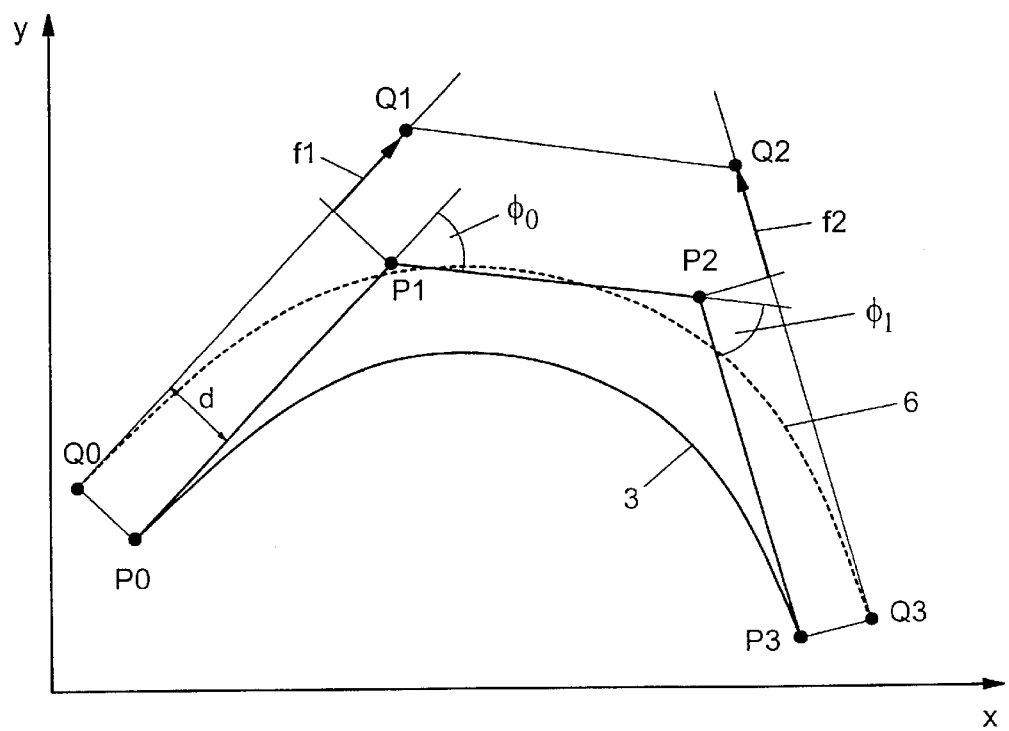
FIG. 4 is another method for generating a frame according to the prior art (EP 0 604 685)

FIG. 4 shows another method of the prior art that is disclosed by European Letters Patent EP 0 604 685. In this method, a framed curve 6 is constructed for the Bezier curve 3, this likewise being a cubic Bezier curve and proceeding approximately half the distance of the frame width d from the Bezier curve 3. For that purpose, the checkpoints Q0, Q1, Q2, Q3 of the framed curve 6 are identified. The starting point Q0 is identified in that a perpendicular to the straight line P0-P1 is drawn in the point P0, and the point Q0 is determined on this perpendicular in the spacing of the frame width d. In the same way, the end point Q3 is defined perpendicular to the straight line P2-P3. Parallels to the straight lines P0-P1 or P2-P3 are then drawn through the points Q0 or Q3. The check point Q1 is identified in that a segment Q0-Q1 is calculated on the parallel proceeding through Q0, this deviating by an amount f1 from the length of the straight line P0-P1. The deviation f1 is determined from the angle ψ0 between the straight lines P0-P1 and P1-P2 according to a trigonometric function (Equations 2 and 2' in EP 0 604 685). Deviation f2 is likewise defined from the angle ψ1 between the straight lines P1-P2 and P2-P3 for determining the checkpoint Q2 (Equations 3 and 3' in EP 0 604 685).

An object of the present invention is to avoid the disadvantages of the known methods for generating a frame for graphic objects whose contour is described by a sequence of Bezier curves and to specify an effective method that generates a frame curve for a given, cubic Bezier curve that is likewise a cubic, Bezier curve. The inventive method is more precise than the method disclosed by EP 0 604 685 and also avoids the employment of trigonometric functions.

There is no algorithm with which an exactly parallel Bezier frame curve can be analytically calculated for a given, cubic Bezier curve. Only approximate solutions can exist, whereby the frame curve proceeds approximately parallel to the given curve. For that purpose, the inventive method employs a mid-point PM on the given Bezier curve and a mid-point QM on the frame curve to be produced. In order to better understand the later explanation of the inventive method, the known method for construction of a mid-point PM on a cubic Bezier curve shall first be described.

Figure 5:
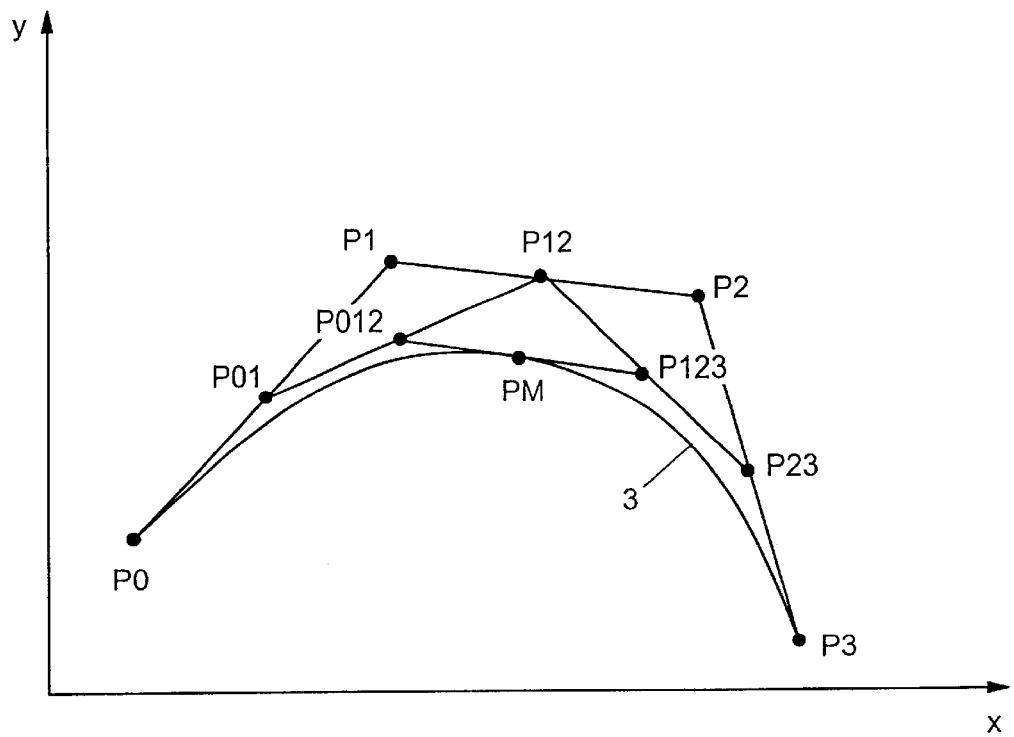
FIG. 5 illustrates the construction of a mid-point PM on the Bezier curve.

FIG. 5 shows the known method for constructing the mid-point PM. What is defined as mid-point PM is the point on the curve that derives for t=0.5 according to Equation (1). First, the points P01, P12, P23 are identified, these deriving from the bisection of the straight lines P0-P1, P1-P2 and P2-P3. These new points are connected by two straight lines P01-P12 and P12-P23. By bisecting these straight lines, one obtains the further points P012 and P123 that are in turn connected by a straight line. The bisection of the line P012-P123 finally yields the mid-point PM on the Bezier curve. The straight line P012-P123 is a tangent of the Bezier curve at the point PM. The x and y coordinates of the points participating in this construction derive as follows:

$$\begin{aligned}
xP01 &= (xP0 + xP1)/2 & yP01 &= (yP0 + yP1)/2 & (2)\\
xP12 &= (xP1 + xP2)/2 & yP12 &= (yP1 + yP2)/2\\
xP23 &= (xP2 + xP3)/2 & yP23 &= (yP2 + yP3)/2\\
xP012 &= (xP01 + xP12)/2 & yP012 &= (yP01 + yP12)/2\\
xP123 &= (xP12 + xP23)/2 & yP123 &= (yP12 + yP23)/2\\
xPM &= (xP012 + xP123)/2 & yPM &= (yP012 + yP123)/2
\end{aligned}$$

This design principle is not only valid for the determination of the mid-point PM, i.e. for t=0.5, but is also valid for the design of an arbitrary division point on the Bezier curve given t=s. Only all of the straight lines employed in the design are then divided in the relationship (1−s) relative to s, and the equation system (2) must be correspondingly adapted, i.e. xp01=(1−s)·xP0+s·xP1, etc. As a result of this design of the mid-point PM (or of an arbitrary division point), the Bezier curve is divided into two Bezier sub-curves. The checkpoints of the first sub-section are P0, P01, P012, PM, and the checkpoints of the second sub-section are PM, P123, P23, P3.

Figure 6:
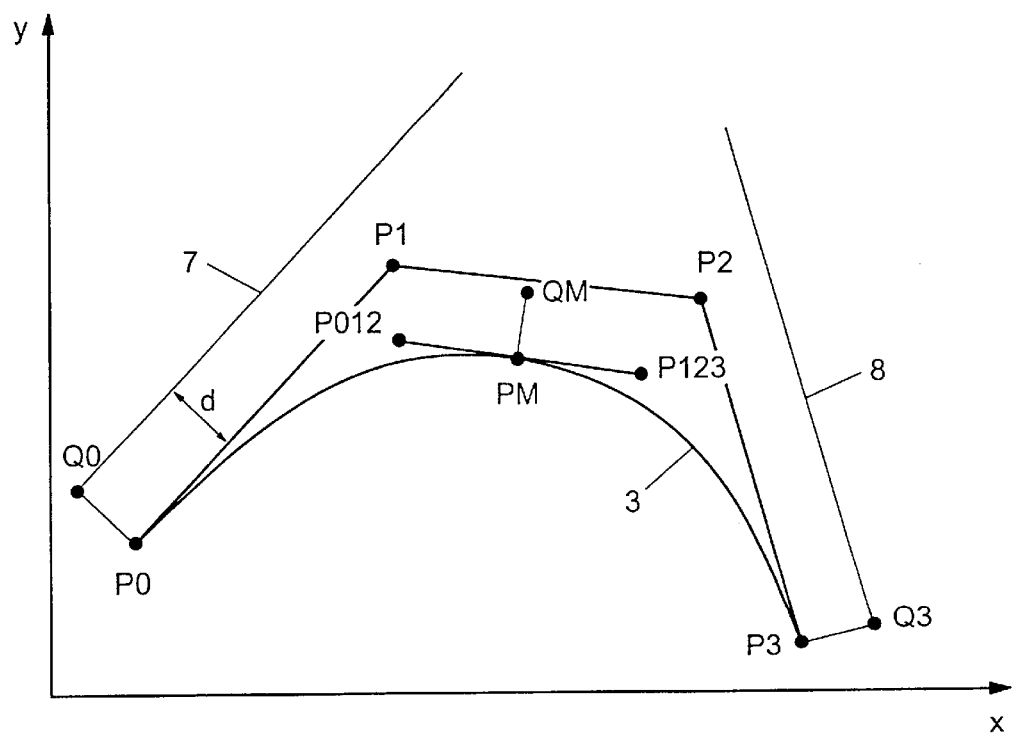
FIG. 6 shows the construction of a mid-point PM for a frame curve.

FIG. 6 shows the first steps of the inventive method. The starting point Q0 of the frame curve to be generated is identified, in that a perpendicular to the straight line P0-P1 is drawn in the point P0, and the point Q0 is defined on this perpendicular in the spacing of the frame width d. In the same way, the endpoint Q3 is determined perpendicular to the straight line P2-P3. The parallels 7 or 8 for the straight lines P0-P1 or, respectively, P2-P3 are then drawn through the points Q0 or Q3. In the next step, the mid-point PM of the Bezier curve 3 is determined in the described way according to equations 2. Though sitting from the mid-point PM, the mid-point QM of the frame curve to be produced is then determined perpendicular to the straight line P012-P123, i.e. perpendicular to the Bezier curve as well, being determined in the spacing d.

In the next steps, the checkpoints Q1 and Q2 that are still missing for the frame curve to be produced are identified. It is defined as a first condition that Q1 must lie on the parallel 7 and Q2 must lie on the parallel 8 so that the frame curve proceeds parallel to the original Bezier curve (3) in the starting point Q0 and in the endpoint Q3. The following relationships derive from the equality of the slopes of the straight lines P0-P1 and Q0-Q1, on the one hand, as well as P2-P3 and Q2-Q3, on the other hand, for the x, y-coordinates of the points P0 . . . P3 and Q0 . . . Q3:

$$(yQ1-yQ0)/(xQ1-xQ0)=(yP1-yP0)/(xP1-xP0) \quad (3)$$

$$(yQ2-yQ3)/(xQ2-xQ3)=(yP2-yP3)/(xP2-xP3) \quad (4)$$

The coordinates (xQ1, yQ1) and (xQ2, yQ2) of the checkpoints Q1 and Q2 are still unknowns in the equations 3 and 4.

Figure 7:
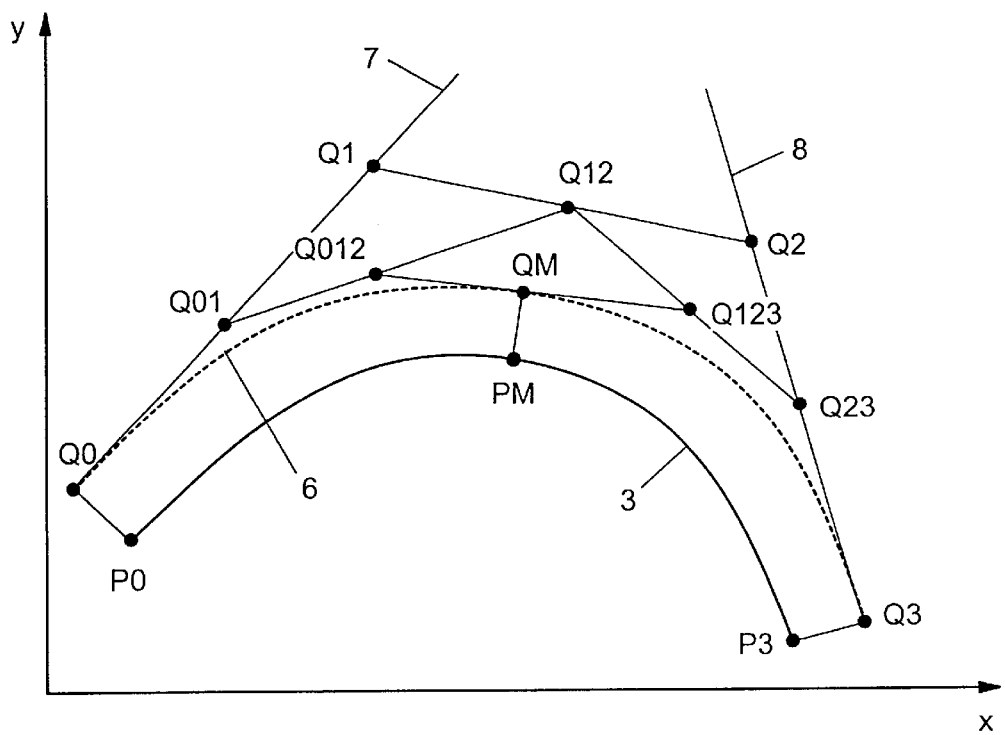
FIG. 7 illustrates the relationship between the mid-point QM and the checkpoints Q0, Q1, Q2, Q3 of the frame curve.

A further condition for determining the checkpoints Q1 and Q2 derives therefrom that the previously defined mid-point QM could also be constructed in the same way from the checkpoints Q0, Q1, Q2, Q3 of the frame curve to be produced, just like the mid-point PM was constructed from the checkpoints P0, P1, P2, P3. This is shown in FIG. 7. The relationships that are analogous to the equation system 2 exist between the points Q0, Q1, Q2, Q3, Q01, Q12, Q23, Q012, Q123 participating in the design of the mid-point QM:

$$xQ01 = (xQ0 + xQ1)/2 \qquad yQ01 = (yQ0 + yQ1)/2 \quad (5)$$
$$xQ12 = (xQ1 + xQ2)/2 \qquad yQ12 = (yQ1 + yQ2)/2$$
$$xQ23 = (xQ2 + xQ3)/2 \qquad yQ23 = (yQ2 + yQ3)/2$$
$$xQ012 = (xQ01 + xQ12)/2 \qquad yQ012 = (yQ01 + yQ12)/2$$
$$xQ123 = (xQ12 + xQ23)/2 \qquad yQ123 = (yQ12 + yQ23)/2$$
$$xQM = (xQ012 + xQ123)/2 \qquad yQM = (yQ012 + yQ123)/2$$

The equation system 5 can be simplified to form the following two equations:

$$xQM=(xQ0+3 \cdot xQ1+3 \cdot xQ2+xQ3)/8 \quad (6)$$

$$yQM=(yQ0+3 \cdot yQ1+3 \cdot yQ2+yQ3)/8 \quad (7)$$

The four as yet unknown coordinates xQ1, yQ1, xQ2, yQ2 for the checkpoints Q1 and Q2 for the frame curve 6 to be produced can now be calculated from the four equations (3) (4) (6) and (7).

Instead of the mid-point PM of the Bezier curve to be framed, the inventive method can also be implemented with some other, arbitrary division point of the Bezier curve, for example with the division point that derives for t=0.4. As already described above, the equation system 5 must then be correspondingly adapted. The method is also not limited to the production of an outside frame, as shown in the figures. When the given Bezier curve is to be framed toward the inside, the points Q0, Q3 and QM must merely be respectively defined toward the inside of the curve at the spacing of the frame width. When a central frame is to be produced, an outer and an inner frame curve are generated and the area between them forms the frame.

It can be necessary in special instances to resolve the given Bezier curve into sub-curves in the described way before a respective frame curve is produced for the sub-curves. Such special instances derive when (a) the checkpoints P1 and P2 do not lie on the same side of the connecting line P0-P3 or (b) the straight lines P0-P1 and P2-P3 intersect or (c) the distances between the points P0-P2 and the points P1-P3 are both greater than the distance between the points P0-P3.

Figure 8:
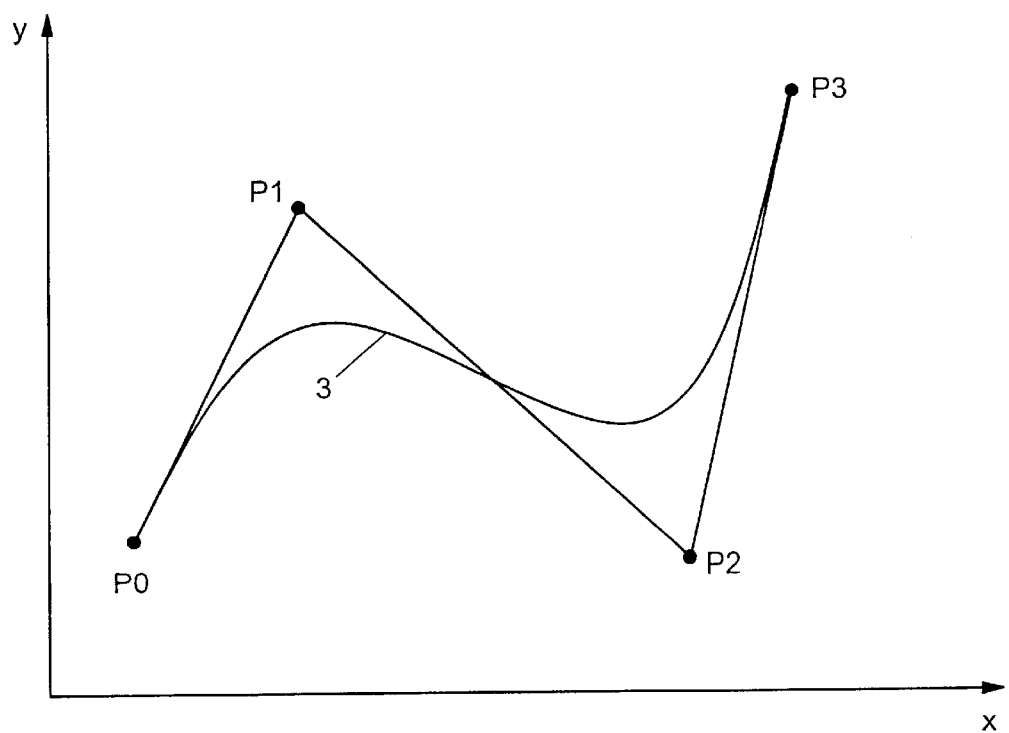
FIG. 8 shows a first special instance for a Bezier curve.
Figure 9:
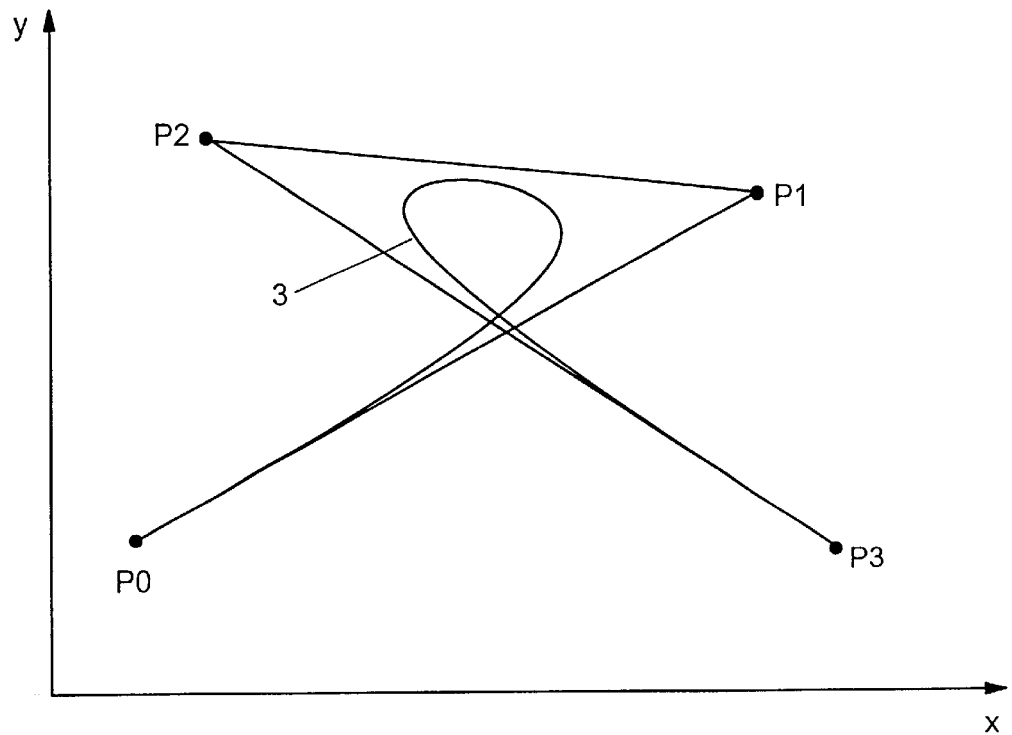
FIG. 9 illustrates a second special instance for a Bezier curve.
Figure 10:
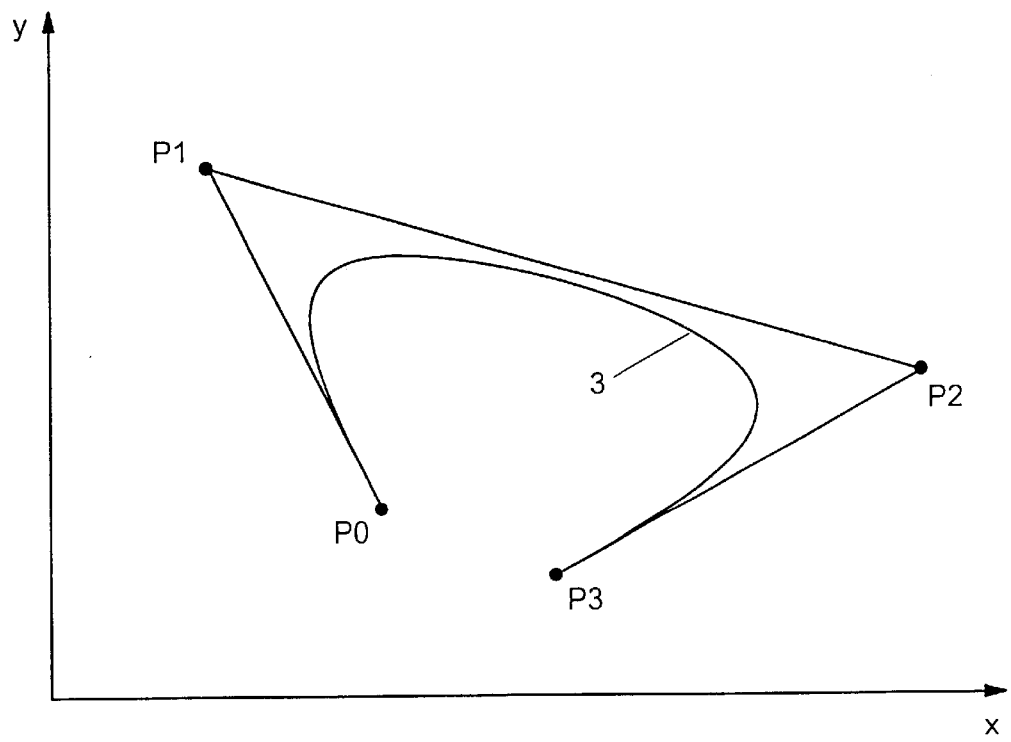
FIG. 10 shows a third special instance for a Bezier curve.

FIG. 8 shows the special instance (a) wherein the Bezier curve 3 has a turning point. FIG. 9 shows the special instance (b) wherein the Bezier curve 3 intersects itself. FIG. 10 shows the special instance (c) wherein the Bezier curve 3 erects more than a semicircle.

Figure 11:
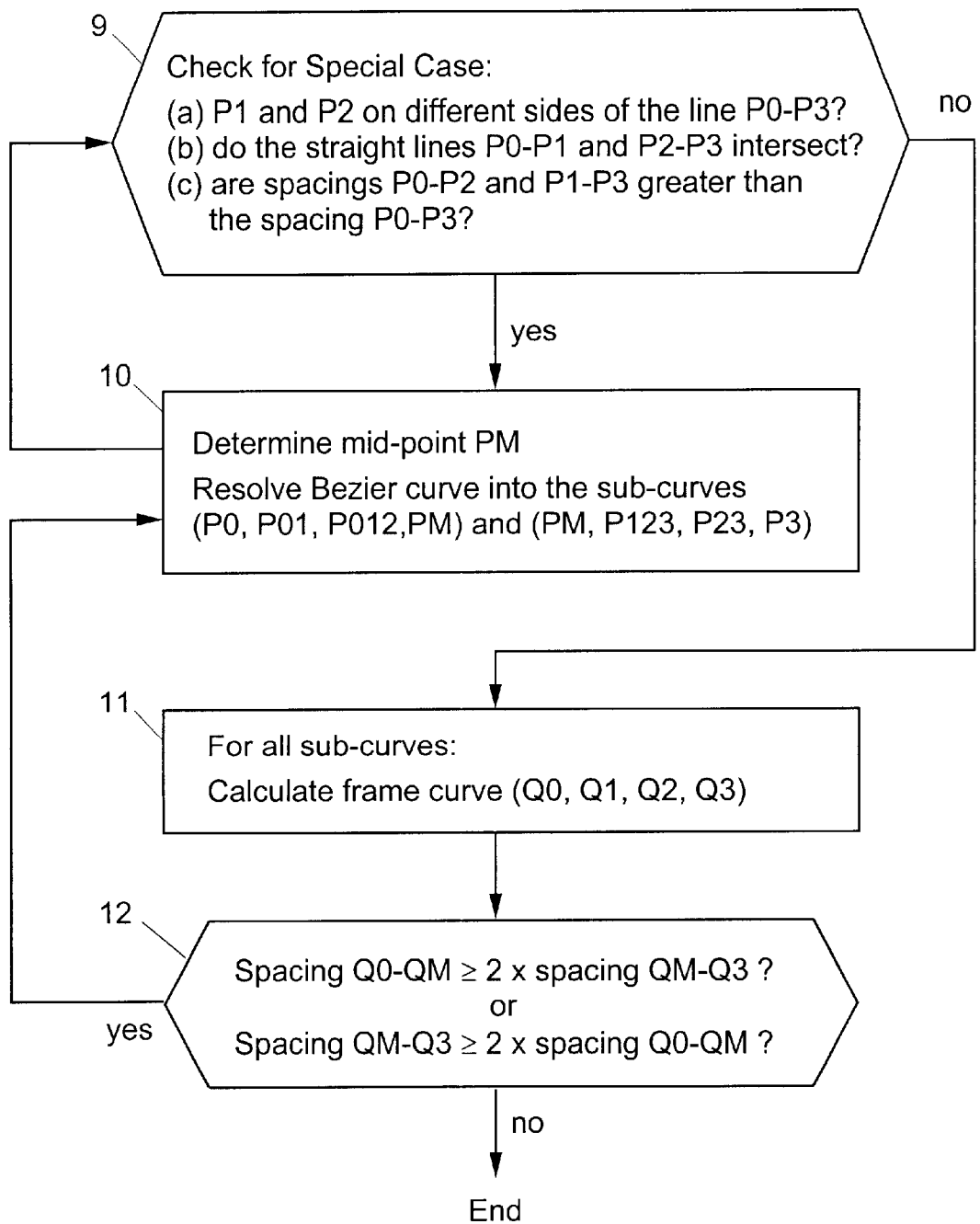
FIG. 11 is a flowchart for framing Bezier curves.

FIG. 11 shows the framing of a Bezier curve taking special instances into consideration as a flowchart. A check is carried out in step 9 to see whether one of the three above-described special instances (a), (b), or (c) is present. If no, one proceeds to step 11. When a special instance is present, the mid-point PM of the Bezier curve is first identified in the step 10, and the curve is then divided into the sub-curves (P0, P01, P012, PM) and (PM, P123, P23, P3) (also see FIG. 5). Subsequently, one returns to step 9 in order to check whether one of the special instances is present for the sub-curves. If yes, the corresponding sub-curve is again divided in step 10 etc.

In step 11, the frame curve is determined for all sub-curves according to the inventive method by calculating the checkpoints Q0, Q1, Q2, Q3. In the following step 12, a check is carried out for all frame curves to see whether the distance Q0-QM is greater than or equal to twice the distance QM-Q3 or conversely. When this is the case, the mid-point QM is too close to the starting point Q0 or to the end point Q3 of the frame curve. There is then the possibility that the produced frame curve is too poor an approximation, i.e. does not proceed adequately parallel to the corresponding original curve. It is then better to return to step 10 and to divide the curve again. Checking for twice the distance is an empirical value that has proven itself in practice. In step 12, however, some other check equation can be employed, this making it possible to identify whether the point QM is located approximately in the middle between the points Q0 and Q3.

Although various minor modifications might be suggested by those skilled in the art, it should be understood that my wish to embody within the scope of the patent warranted hereon all such modifications as reasonably and properly come with the scope of my contribution to the art.

I claim as my invention:

1. A method for framing a graphic object whose contour is described by cubic Bezier curves by producing an approximately parallel, cubic Bezier frame curve having checkpoints Q0, Q1, Q2, Q3 for each given cubic Bezier curve of the contour having checkpoints P0, P1, P2, P3, comprising the steps of:

defining the checkpoint Q0 proceeding from the checkpoint P0 perpendicular to a line P0-P1 at a spacing of a frame width;

defining the checkpoint Q3 proceeding from the checkpoint P3 perpendicular to a line P2-P3 at the spacing of the frame width;

placing the checkpoint Q1 onto a first parallel that proceeds through the checkpoint Q0 parallel to the line P0-P1;

placing the checkpoint Q2 onto a second parallel that proceeds through the checkpoint Q3 parallel to the line P2-P3;

constructing a mid-point PM for the given Bezier curve from the checkpoints P0, P1, P2, P3;

determining a mid-point QM for the Bezier frame curve to be produced proceeding from the mid-point PM perpendicular to the given Bezier curve at the spacing of the frame width; and calculating a position of the checkpoint Q1 on the first parallel and the checkpoint Q2 on the second parallel from a condition that the mid-point QM can be constructed in the same way from the checkpoints Q0, Q1, Q2, Q3 as the mid-point PM is constructed from the checkpoints P0, P1, P2, P3.

2. The method according to claim 1 wherein the mid-points PM and QM are division points of the given Bezier curve or of the Bezier frame curve to be produced.

3. The method according to claim 1 wherein the given Bezier curve is divided into sub-sections and a Bezier frame curve is produced for each sub-section.

4. The method according to claim 3 wherein the given Bezier curve is divided into sub-sections when it has a turning point.

5. The method according to claim 3 wherein the given Bezier curve is divided into sub-sections when it intersects itself.

6. The method according to claim 3 wherein the given Bezier curve is divided into sub-sections when it describes an angle of 180° or more.

7. The method according to claim 3 wherein the given Bezier curve is divided into sub-sections when the mid-point QM in the generated Bezier frame curve lies too close to the checkpoint Q0 or to the checkpoint Q3.

* * * * *